US011939168B2

(12) United States Patent
Smith et al.

(10) Patent No.: US 11,939,168 B2
(45) Date of Patent: Mar. 26, 2024

(54) SERVO-DRIVEN VIBRATORY CONVEYOR

(71) Applicant: TriDelta Systems, LLC, Abbeville, AL (US)

(72) Inventors: Benjamin Decker Smith, Abbeville, AL (US); Michael Pierce Woodall, Headland, AL (US); James Cody Bach, Slocomb, AL (US)

(73) Assignee: TriDelta Systems, LLC

( * ) Notice: Subject to any disclaimer, the term of this patent is extended or adjusted under 35 U.S.C. 154(b) by 194 days.

(21) Appl. No.: 17/497,464

(22) Filed: Oct. 8, 2021

(65) Prior Publication Data

US 2023/0115607 A1 Apr. 13, 2023

(51) Int. Cl.
| | |
|---|---|
| B65G 27/24 | (2006.01) |
| B07B 1/36 | (2006.01) |
| B07B 1/42 | (2006.01) |
| B65G 27/04 | (2006.01) |
| B65G 27/32 | (2006.01) |
| B65G 41/00 | (2006.01) |

(52) U.S. Cl.
CPC ............... *B65G 27/24* (2013.01); *B07B 1/36* (2013.01); *B07B 1/42* (2013.01); *B65G 27/04* (2013.01); *B65G 27/32* (2013.01); *B65G 41/002* (2013.01); *B65G 41/007* (2013.01)

(58) Field of Classification Search
CPC ........ B65G 27/04; B65G 27/08; B65G 27/24; B65G 27/32; B65G 41/002; B65G 41/007; B65G 2812/0308; B65G 2812/0336; B07B 1/36; B07B 1/42
See application file for complete search history.

(56) References Cited

U.S. PATENT DOCUMENTS

| | | | | |
|---|---|---|---|---|
| 3,581,871 A | * | 6/1971 | Forman ................. | B65G 27/00 177/121 |
| 4,371,800 A | | 2/1983 | Brander | |
| 5,178,259 A | * | 1/1993 | Musschoot ............ | B65G 27/32 198/770 |
| 5,816,386 A | * | 10/1998 | Carlyle ................. | B65G 27/22 198/761 |

(Continued)

FOREIGN PATENT DOCUMENTS

| | | |
|---|---|---|
| EP | 0760497 B1 | 5/2000 |
| EP | 3800147 A1 | 4/2021 |
| JP | 3800833 B2 | 7/2006 |

*Primary Examiner* — Gene O Crawford
*Assistant Examiner* — Keith R Campbell
(74) *Attorney, Agent, or Firm* — Dorton & Willis, LLP (57) ABSTRACT

Vibratory conveyors, vibratory conveyor systems, and related methods are disclosed. An exemplary vibratory conveyor includes a support frame; a pan configured to receive a conveyed material, the pan mounted for cyclic movement relative to the support frame, the pan having a pan axis generally aligned with a conveying direction; and at least two linear servomotors operatively coupled to move the pan relative to the support frame, the at least two linear servomotors comprising a first linear servomotor and a second linear servomotor. The first linear servomotor defines a first linear servomotor actuating axis, the second linear servomotor defines a second linear servomotor actuating axis, and the first linear servomotor actuating axis is oriented obliquely relative to the second linear servomotor actuating axis.

19 Claims, 7 Drawing Sheets

(56) References Cited

U.S. PATENT DOCUMENTS

| | | | | |
|---|---|---|---|---|
| 5,853,082 | A * | 12/1998 | Buckley | B65G 27/20 198/752.1 |
| 6,189,683 | B1 * | 2/2001 | Svejkovsky | B65G 27/30 198/764 |
| 6,357,579 | B1 | 3/2002 | Patterson et al. | |
| 6,457,577 | B1 | 10/2002 | Ikeda et al. | |
| 6,527,104 | B2 | 3/2003 | Svejkovsky et al. | |
| 7,399,383 | B2 | 7/2008 | Giovinazzo | |
| 7,735,633 | B2 * | 6/2010 | Kraus | B65G 27/32 198/753 |
| 8,733,539 | B2 | 5/2014 | Choy et al. | |
| 9,481,526 | B1 * | 11/2016 | Groenewald | B65G 27/32 |
| 11,046,528 | B2 * | 6/2021 | Olmstead | B65G 27/34 |
| 2002/0023824 | A1 | 2/2002 | Patterson et al. | |
| 2002/0125109 | A1 | 9/2002 | Ikeda et al. | |
| 2007/0193854 | A1 | 8/2007 | Eaton et al. | |
| 2007/0193858 | A1 | 8/2007 | Hillstrom et al. | |
| 2019/0241369 | A1 | 8/2019 | Reeser et al. | |
| 2020/0339358 | A1 | 10/2020 | Olmstead | |

\* cited by examiner

SERVO-DRIVEN VIBRATORY CONVEYOR

TECHNICAL FIELD

The present invention relates generally to conveyors and, more particularly, to vibratory conveyors and vibratory conveyor systems, and related methods.

BACKGROUND

The present disclosure contemplates that conveyors are used to move conveyed materials between locations. Vibratory conveyors utilize vibrational motion of a pathway to move the conveyed material along the pathway. Vibratory conveyors may be used in various industries to move a wide variety of conveyed materials, such as coal, limestone, sand, gravel, wood chips, plastics, metals, seeds, grains, pharmaceuticals and food materials, for example.

The present disclosure contemplates that some known vibratory conveyors may require frequent maintenance or parts replacement, such as may be to wear of components. Some known vibratory conveyors may be configured so that the vibratory motion is not adjustable or is substantially limited in its adjustability; however, in some circumstances, it may be advantageous to vary the vibratory motion profile of a vibratory conveyor. Accordingly, for these and other reasons, there is a need for improved vibratory conveyors and related methods.

SUMMARY

The present invention provides vibratory conveyors, vibratory conveyor systems, and related methods. While the invention will be described in connection with certain embodiments, it will be understood that the invention is not limited to these embodiments. Rather, the invention includes all alternatives, modifications, and equivalents as may be included within the spirit and scope of the present disclosure.

It is an aspect of the present disclosure to provide a vibratory conveyor including a support frame; a pan configured to receive a conveyed material, the pan mounted for cyclic movement relative to the support frame, the pan having a pan axis generally aligned with a conveying direction; and at least two linear servomotors operatively coupled to move the pan relative to the support frame, the at least two linear servomotors comprising a first linear servomotor and a second linear servomotor. The first linear servomotor defines a first linear servomotor actuating axis, and the second linear servomotor defines a second linear servomotor actuating axis. The first linear servomotor actuating axis is oriented obliquely relative to the second linear servomotor actuating axis.

In one embodiment, the first linear servomotor actuating axis is oriented obliquely relative to the pan axis. In one embodiment, the second linear servomotor actuating axis is oriented substantially parallel to the pan axis.

In an exemplary embodiment, the vibratory conveyor further includes a linear slide connector operatively interposing the pan and the support frame. The first linear servomotor is operatively coupled to move the pan along a path defined by the slide connector. The slide connector is angularly repositionable about a generally horizontal axis. The second linear servomotor is operatively coupled to angularly reposition the slide connector about the axis.

It is an aspect of the present disclosure to provide a vibratory conveyor system including the vibratory conveyor described above and a controller configured to direct operation of the first linear servomotor and the second linear servomotor.

It is an aspect of the present disclosure to provide a drive system for a vibratory conveyor, the vibratory conveyor including a conveyor element mounted for movement relative to a support element. The drive system includes a first pivot connector including a first pivot connector first element rotatably coupled to a first pivot connector second element, the first pivot connector first element configured to be coupled to the conveyor element; a first slide connector including a first slide connector first element slidably coupled to a first slide connector second element, the first slide connector first element coupled to the first pivot connector second element; a second pivot connector including a second pivot connector first element rotatably coupled to a second pivot connector second element, the second pivot connector first element coupled to the first slide connector second element, and the second pivot connector second element configured to be coupled to the support element; a first actuator operatively arranged to slide the first slide connector first element relative to the first slide connector second element; and a second actuator operatively coupled between the second pivot connector first element and the second pivot connector second element, the second actuator operative to rotate the second pivot connector first element relative to the second pivot connector second element.

In one embodiment, the first actuator is operatively disposed between the first pivot connector first element and the second pivot connector second element. The first actuator includes a first linear actuator including a first linear actuator first component actuatable for linear movement with respect to a first linear actuator second component. The first linear actuator first component is configured to be pivotably coupled to the first pivot connector first element. The first linear actuator second component is configured to be pivotably coupled to the second pivot connector second element. The first linear actuator first component is configured to be pivotably coupled to the conveyor element. The second actuator includes a second linear actuator including a second linear actuator first component actuatable for linear movement with respect to a second linear actuator second component. The second linear actuator first component is pivotably coupled to the second pivot connector first element. The second linear actuator second component is pivotably coupled to the second pivot connector second element. The first linear actuator defines a first linear actuator actuating axis, the second linear actuator defines a second linear actuator actuating axis, and the first linear actuator actuating axis is oriented obliquely relative to the second linear actuator actuating axis.

In an exemplary embodiment, the second pivot connector first element includes a swing arm. The first slide connector is disposed on the swing arm at a first radial distance from an axis of rotation of the swing arm, and the first radial distance is greater than zero. The second actuator includes a second linear actuator. The second linear actuator includes a second linear actuator first component actuatable for linear movement with respect to a second linear actuator second component. The second linear actuator first component is pivotably coupled to the swing arm at a second radial distance from the axis of rotation of the swing arm, and the second radial distance is greater than the first radial distance.

In one embodiment, the drive system further includes a controller configured to direct operation of the first actuator and the second actuator.

It is an aspect of the present disclosure to provide a vibratory conveyor system including the drive system described above; the conveyor element, the first pivot connector coupled to the conveyor element; and the support element, the second pivot connection coupled to the support element.

In an exemplary embodiment, the conveyor element includes a pan configured to receive a conveyed material. The pan comprises a screen configured to separate the conveyed material.

It is an aspect of the present disclosure to provide a method of making a vibratory conveyor system including coupling a first pivot connector to a first slide connector; coupling the first slide connector to a second pivot connector; coupling the second pivot connector to a support element; coupling a conveyor element to the first pivot connector; operatively coupling a first actuator to move the conveyor element along the first slide connector relative to the second pivot connector; and operatively coupling a second actuator to rotationally reposition the first slide connector about the second pivot connector.

In one embodiment, the first actuator comprises a first linear actuator defining a first linear actuator actuating axis, and the conveyor element is arranged along a conveyor element axis generally aligned with a conveying direction. Operatively coupling the first actuator to move the conveyor element along the first slide connector relative to the second pivot connector includes mounting the first linear actuator so that the first linear actuator actuating axis is oriented obliquely relative to the conveyor element axis.

In an exemplary embodiment, the second actuator comprises a second linear actuator defining a second linear actuator actuating axis. Operatively coupling the second actuator to rotationally reposition the first slide connector about the second pivot connector includes mounting the second linear actuator so that the second linear actuator actuating axis is oriented substantially parallel with the conveyor element axis.

In one embodiment, the first pivot connector includes a first pivot connector first element rotatably coupled to a first pivot connector second element, the first slide connector includes a first slide connector first element slidably coupled to a first slide connector second element, and the second pivot connector includes a second pivot connector first element rotatably coupled to a second pivot connector second element. Coupling the first pivot connector to the first slide connector includes coupling the first pivot connector second element to the first slide connector first element. Coupling the first slide connector to the second pivot connector includes coupling the first slide connector second element to the second pivot connector first element. Coupling the second pivot connector to the support element includes coupling the second pivot connector second element to the support element. Coupling the conveyor element to the first pivot connector includes coupling the conveyor element to the first pivot connector first element. Operatively coupling the first actuator to move the conveyor element along the first slide connector relative to the second pivot connector includes pivotably coupling the first actuator to the first pivot connector first element and pivotably coupling the first actuator to the second pivot connector second element. Operatively coupling the second actuator to rotationally reposition the first slide connector about the second pivot connector includes pivotably coupling the second actuator to the second pivot connector first element and pivotably coupling the second actuator to the second pivot connector second element.

In an exemplary embodiment, the method includes programming a controller to direct operation of the first actuator and the second actuator to generate a cyclic motion of the conveyor element.

It is an aspect of the present disclosure to provide a method of operating a vibratory conveyor system including moving a conveyor element in a cyclic motion including a horizontal component and a vertical component by, in each of a plurality of repeated cycles, operating a first actuator to move the conveyor element along a path defined by a linear slide connector, the slide connector operatively interposing the conveyor element and a support element, and operating a second actuator to change an angle of the slide connector relative to horizontal.

In one embodiment, moving the conveyor element in the cyclic motion includes simultaneously operating the first actuator to move the conveyor element along the path and operating the second actuator to change the angle of the slide connector relative to horizontal.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
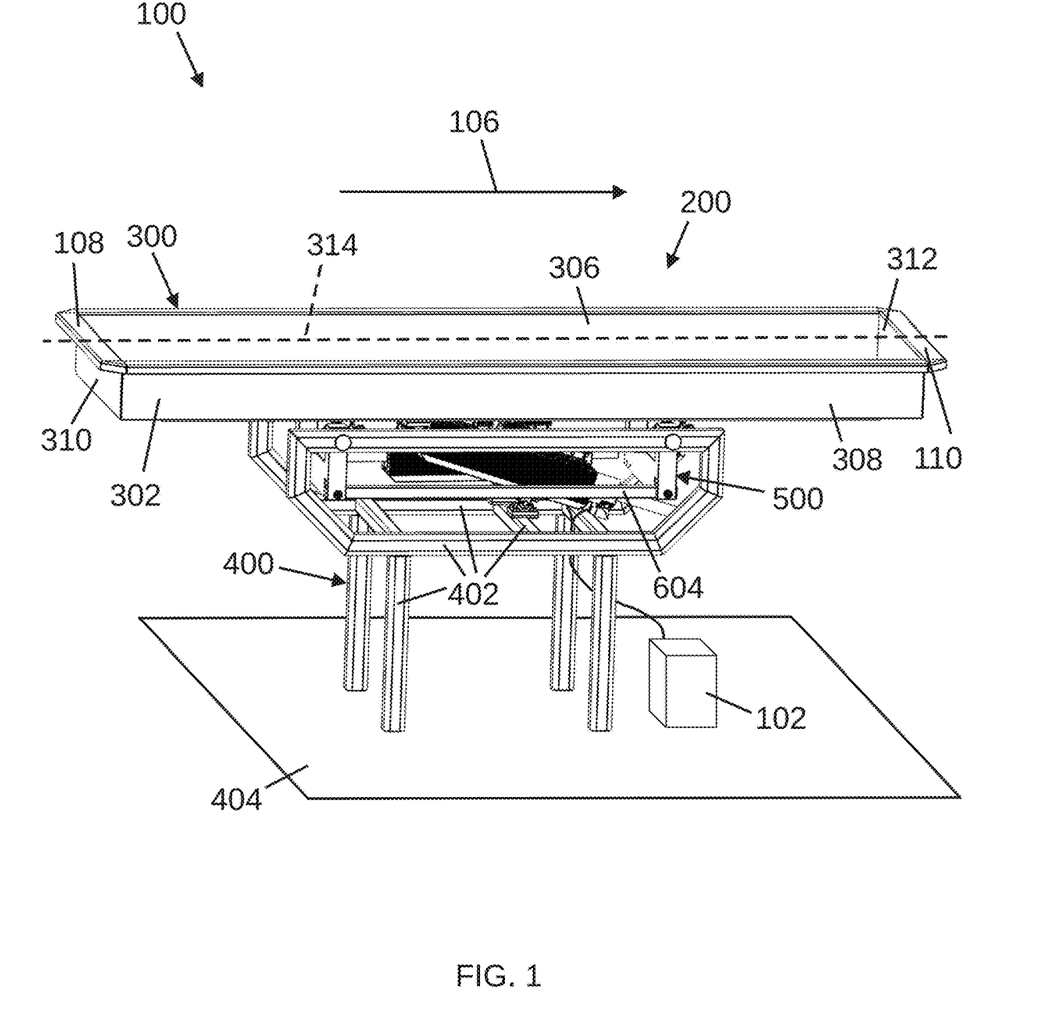
FIG. 1 is a perspective view of an exemplary vibratory conveyor system in accordance with the principles of the present disclosure.
Figure 2:
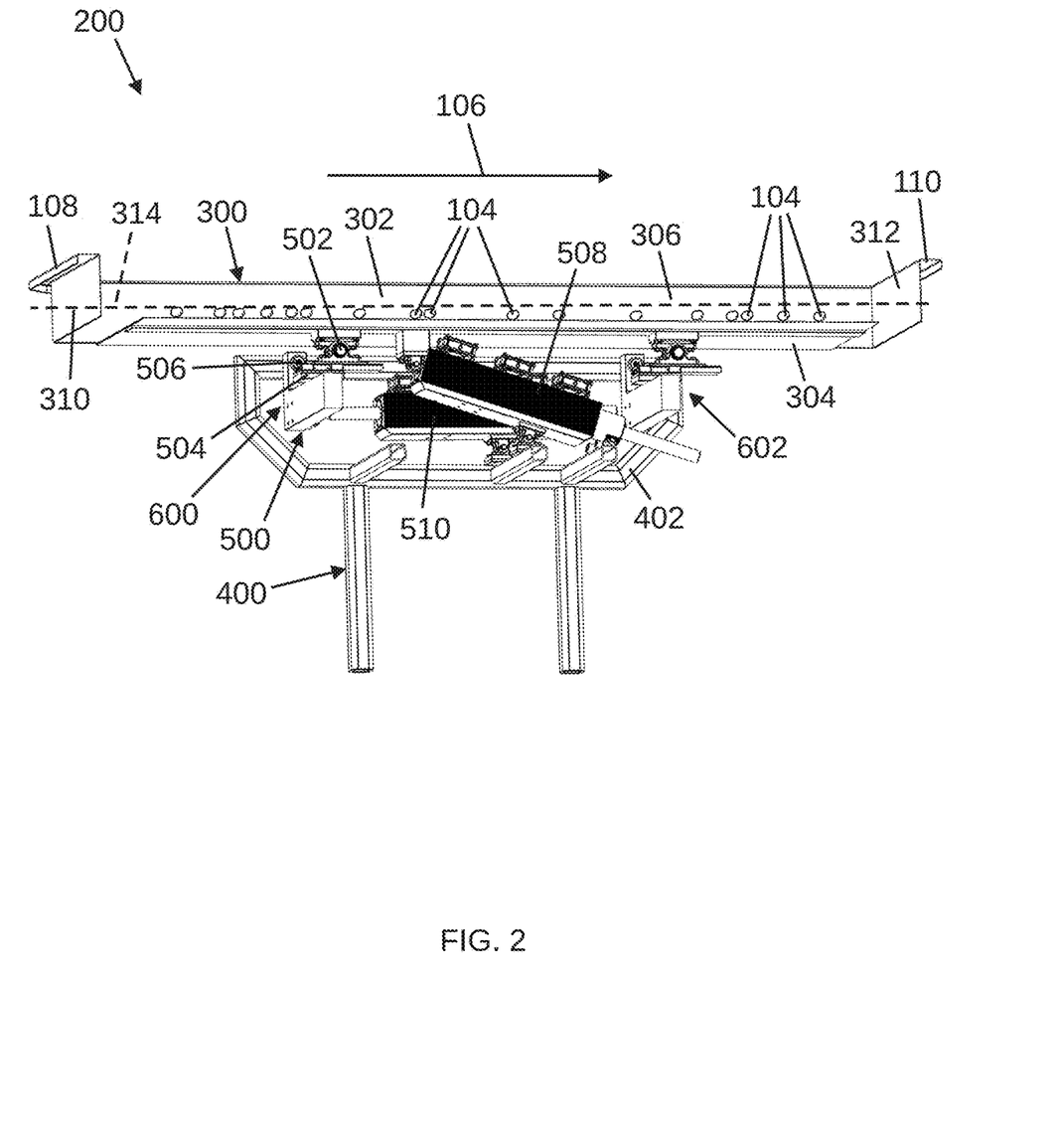
FIG. 2 is a perspective cutaway view of an exemplary vibratory conveyor of the vibratory conveyor system of FIG. 1.

FIG. 1 is a perspective view of an exemplary vibratory conveyor system 100 in accordance with the principles of the present disclosure. FIG. 2 is a perspective cutaway view of an exemplary vibratory conveyor 200 of the vibratory conveyor system 100 of FIG. 1. Referring to FIGS. 1 and 2, in the embodiment shown, the vibratory conveyor system 100 includes the vibratory conveyor 200 and a controller 102, which is configured to direct operation of the vibratory conveyor 200. Generally, the vibratory conveyor system 100 is configured to move a conveyed material 104 in a conveying direction 106 generally from an input end 108 toward an output end 110.

As used herein, "conveying direction" may refer to a direction of movement of the conveyed material 104 in a first (e.g., "forward") direction. For clarity, throughout the following description the conveying direction 106 is illustrated in a consistent orientation with respect to the various components of the vibratory conveyor system 100. However, it is to be understood that some exemplary vibratory conveyor systems 100 may be capable of operation to cause movement of the conveyed material 104 in a second (e.g., "reverse") direction (e.g., opposite the first direction), in addition to or instead of operation in the first direction. Accordingly, the "conveying direction" as discussed in the present disclosure should be understood merely as a consistent reference direction across various drawing views to aid in understanding the description herein and should not be construed as a limiting aspect.

In the embodiment shown, the vibratory conveyor 200 includes a conveyor element 300 configured to receive the conveyed material 104. The vibratory conveyor 200 further includes a support element 400 and a drive system 500. The conveyor element 300 is mounted for movement relative to the support element 400 by the drive system 500 to move the conveyed material 104 in the conveying direction 106.

In the embodiment shown, the conveyor element 300 is a generally rectangular pan 302 configured to receive the conveyed material 104. The pan 302 includes a bottom wall 304, left and right lateral side walls 306, 308, and input and output axial end walls 310, 312. The conveyor element 300 is arranged along a conveyor element axis 314 (e.g., the pan 302 defines a pan longitudinal axis 314), which is generally aligned with (e.g., generally parallel to) the conveying direction 106. In alternative exemplary embodiments, various dimensions of the conveyor element 300 may be selected as desired for particular applications. For example, the pan 302 may be narrower or wider, shorter or longer, and/or shallower or deeper as may be suitable for an intended use of the vibratory conveyor system 100.

In some exemplary embodiments, the conveyor element 300 includes a separating element configured to separate the conveyed material 104. For example, a portion of the bottom wall 304 of the pan may include a screen configured to separate relatively smaller pieces of the conveyed material 104 from relatively larger pieces of the conveyed material 104.

In alternative exemplary embodiments, the conveyor element 300 may include other structures configured to at least partially contain and/or provide a pathway for the conveyed material 104. For example, alternative conveyor elements 300 may be generally in the form of troughs, slots, or tracks.

Further, although the illustrated embodiment includes a generally linearly arranged pan 302, some alternative exemplary embodiments may include conveyor elements 300 including one or more non-linear portions, such as curved portions or angled portions. Additionally, although the illustrated embodiment includes a pan 302 having a substantially horizontal (e.g., level) bottom wall 304, some alternative exemplary embodiments may include conveyor elements 300 that are arranged in a non-level orientation. For example, an alternative conveyor element 300 may be tilted generally downward from the input end 108 toward the output end 110.

In the embodiment shown, the support element 400 is generally in the form of a support frame 402 and is secured to a support structure 404. The illustrated support frame 402 includes various sections of metal tubing that may be welded together in a desired configuration, for example. In the embodiment shown, the illustrated support structure 404 is a floor of a production facility.

In alternative exemplary embodiments, the support element 400 may be repositionably disposed with respect to the support structure 404. For example, the support element 400 may be disposed on wheels or feet so that the vibratory conveyor 200 can be repositioned relative to the support structure 404. In other exemplary embodiments, the support element 400 may be mounted in various other alternative manners, such as suspended from one or more overhead or laterally positioned support structures.

Figure 3:
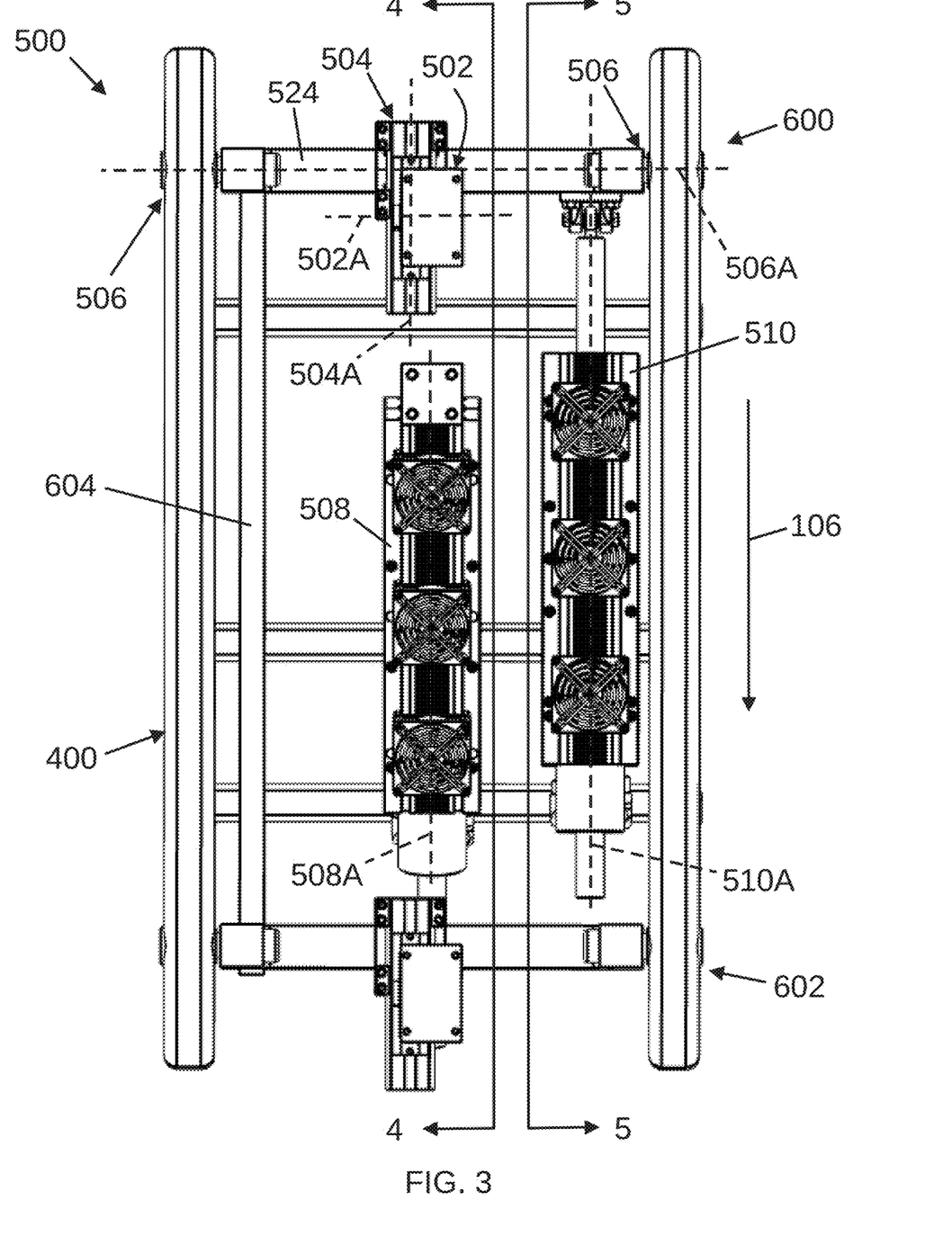
FIG. 3 is a plan view of an exemplary drive system of the vibratory conveyor of FIG. 2.
Figure 4:
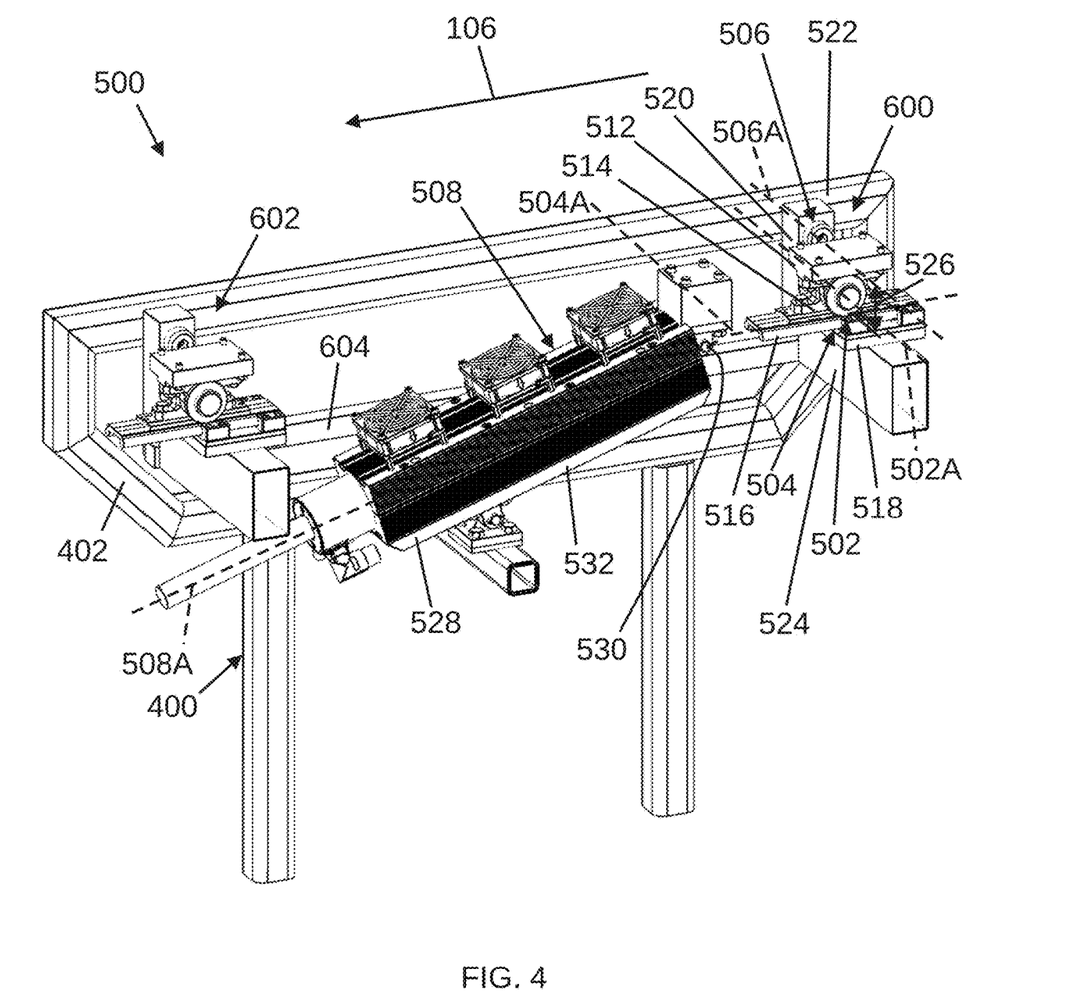
FIG. 4 is a detailed perspective cutaway view of the drive system of the vibratory conveyor of FIG. 2.
Figure 5:
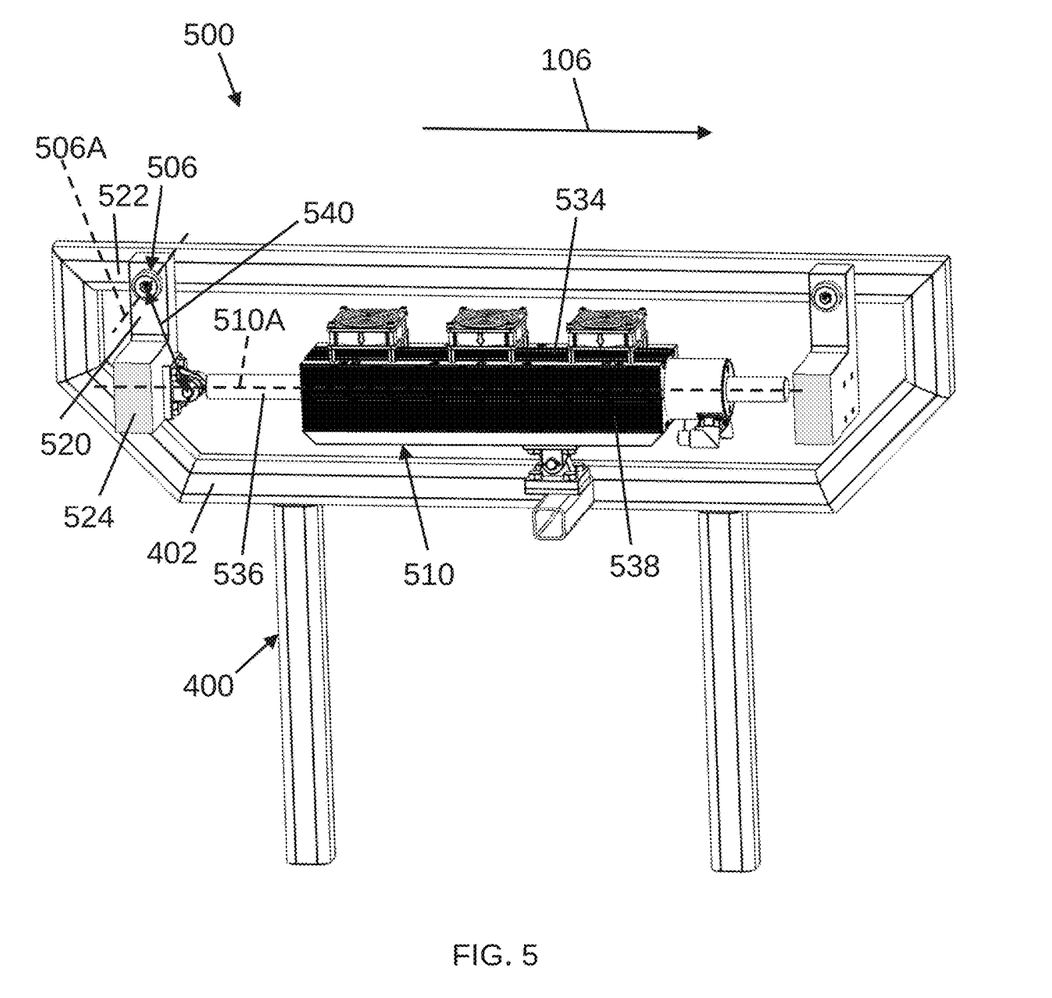
FIG. 5 is a detailed perspective cutaway view of the drive system of the vibratory conveyor of FIG. 2.

FIG. 3 is a plan view of the exemplary drive system 500 of the vibratory conveyor 200 of FIG. 2. FIGS. 4 and 5 are detailed perspective cutaway views of the exemplary drive system 500 of the vibratory conveyor 200 of FIG. 2. FIGS. 3-5 each include at least a portion of the support element 400 for context, and the conveyor element 300 (FIGS. 1 and 2) is not shown in FIGS. 3-5 for visibility of the other components.

Referring to FIGS. 1-5, in the embodiment shown, the drive system 500 includes a first pivot connector 502, a first slide connector 504, and a second pivot connector 506 operatively interposing the conveyor element 300 and the support element 400. The drive system further includes a first actuator 508 and a second actuator 510, which are operable to actuate the drive system 500. The controller 102 is operatively coupled to and is configured to direct operation of the first actuator 508 and the second actuator 510 to cause the drive system 500 to move the conveyor element 300 relative to the support element 400 in various desired motions, such as cyclic vibrational movements. Although the embodiment of FIGS. 1-5 is shown with one first actuator 508 and one second actuator 510, some alternative exemplary embodiments may include one or more first actuators 508 and/or one or more second actuators 510. For example, vibratory conveyors including large or heavy conveyor elements (when empty or in use) may utilize additional similarly arranged actuators as needed to provide sufficient power for movement of the conveyor elements.

Referring to FIGS. 2 and 4, in the embodiment shown, the first pivot connector 502 includes a first pivot connector first element 512 that is rotatably coupled to a first pivot connector second element 514. In the embodiment illustrated, the first pivot connector 502 comprises a steel needle roller bearing. The first pivot connector first element 512 is configured to be coupled to the conveyor element 300, such as to the bottom wall 304 of the pan 302.

Referring to FIGS. 3 and 4, in the embodiment shown, the first pivot connector 502 is configured such that the first pivot connector first element 512 and the first pivot connector second element 514 are relatively rotatable about a first pivot connector axis of rotation 502A. In the embodiment shown, the first pivot connector axis of rotation 502A is generally horizontal and is generally orthogonal to the conveyor element axis 314 (FIGS. 1 and 2). As used herein, "orthogonal" may refer to lines or orientations that are perpendicular to one another (e.g., they are disposed at right angles to one another).

Referring to FIG. 4, in the embodiment shown, the first slide connector 504 includes a first slide connector first element 516 that is slidably coupled to a first slide connector second element 518. In the embodiment shown, the first slide connector 504 is a linear slide connector. For example, the first slide connector 504 may include self-lubricating polymer bearing linear slides and carriages, such as drylin® W double rail slides and guide carriages available from igus, Inc. of East Providence, R. I. The first slide connector first element 516 is coupled to the first pivot connector second element 514.

Referring to FIGS. 3 and 4, in the embodiment shown, the first slide connector 504 is configured such that first slide connector first element 516 and the first slide connector second element 518 are relatively slidable along a generally linear first slide connector sliding path 504A. As shown in FIG. 3, the first slide connector sliding path 504A is generally parallel with the conveying direction 106 (and the conveyor element axis 314 (FIGS. 1 and 2)) when viewed from above. When viewed from the side, the orientation of the first slide connector sliding path 504A relative to the conveying direction 106 (and the conveyor element axis 314 (FIGS. 1 and 2) varies with the rotation of the second pivot connector 506.

Referring to FIGS. 4 and 5, in the embodiment shown, the second pivot connector 506 includes a second pivot connector first element 520 rotatably coupled to a second pivot connector second element 522. In the embodiment illustrated, the second pivot connector 506 comprises a steel needle roller bearing. The second pivot connector first element 520 is coupled to the first slide connector second element 518. In the embodiment shown, the second pivot connector first element 520 includes a swing arm 524, and the second pivot connector axis of rotation 506A is also the axis of rotation of the swing arm 524.

The second pivot connector second element 522 is configured to be coupled to the support element 400. In the embodiment shown, the second pivot connector second element 522 forms a portion of the support frame 402.

Referring to FIGS. 3-5, in the embodiment shown, the second pivot connector 506 is configured such that second pivot connector first element 520 and the second pivot connector second element 522 are relatively rotatable about a second pivot connector axis of rotation 506A. In the embodiment shown, the second pivot connector axis of rotation 506A is generally horizontal, generally in parallel with the first pivot connector axis of rotation 502A, and is generally orthogonal to the conveyor element axis 314 (FIGS. 1 and 2). Referring to FIG. 4, the first slide connector 504 is disposed on the swing arm 524 at a first radial distance 526 (e.g., greater than zero) from the second pivot connector axis of rotation 506A. More specifically, the first slide connector second element 518 is coupled to the swing arm so that the first slide connector sliding path 504A is disposed at the first radial distance 526 from the second pivot connector axis of rotation 506A.

Referring to FIG. 3, in the embodiment shown, the second pivot connector 506 includes two coaxially arranged pivot connectors 506, one generally at each lateral end of the swing arm 524. For simplicity, these pivot connections 506 are described herein as a single pivot connector 506. More generally, in various alternative exemplary embodiments, two or more mechanically corresponding connectors (e.g., pivot connectors 502, 506 and/or slide connectors 504) may be utilized in place of the various individual connectors described herein. For example, some alternative exemplary embodiments may include two or more slide connectors 504 arranged generally in parallel, which may provide improved strength and/or stability for the conveyor element 300.

Referring to FIGS. 2-4, in the embodiment shown, the first actuator 508 includes a first linear actuator 528, such as a first linear servomotor. For example, the first linear servomotor may include a LinMot® encoder and slider available from NTI AG of Spreitenbach, Switzerland. In the embodiment illustrated, the first linear actuator 508 includes a first linear actuator first component 530 actuatable for linear movement with respect to a first linear actuator second component 532. The first actuator 508 defines a first actuator actuating axis 508A along which the first linear actuator first component 530 is movable relative to the first linear actuator second component 532. As shown in FIG. 3, the first actuator actuating axis 508A is generally parallel with the conveying direction 106 (and the conveyor element axis 314 (FIGS. 1 and 2)) when viewed from above. Referring to FIGS. 2-4, when viewed from the side, the orientation of the first actuator actuating axis 508A relative to the conveying direction 106 (and the conveyor element axis 314) varies with the rotation of the second pivot connector 506 and the sliding of the first slide connector 504. In some alternative exemplary embodiments, the first actuator 508 may comprise one or more of any type or configuration of actuator suitable to cause the drive system 500 to move the conveyor element 300 relative to the support element 400 in desired motions as described herein.

In the embodiment shown, the first linear actuator first component 530 is configured to be pivotably coupled to the first pivot connector first element 512. Specifically, the first linear actuator first component 530 is configured to be pivotably coupled to the conveyor element 300 (e.g., the bottom wall 304), and the first pivot connector first element 512 is also configured to be coupled to the conveyor element 300 (e.g., the bottom wall 304). Thus, when the vibratory conveyor 200 is assembled (e.g., when the first linear actuator first component 530 is coupled to the conveyor element 300 and the first pivot connector first element 512 is coupled to the conveyor element 300), the first linear actuator first component 530 is pivotably coupled to the first pivot connector first element 512 via the conveyor element 300 (e.g., indirectly).

In the embodiment shown, the first linear actuator second component 532 is configured to be pivotably coupled to the second pivot connector second element 522. Specifically, the first linear actuator second component 532 is configured to be pivotably coupled to the support frame 402, a portion of which forms the second pivot connector second element 522.

Accordingly, in the embodiment shown, the first actuator 508 is operatively disposed between the first pivot connector first element 512 and the second pivot connector second element 522. And, thus, the first actuator 508 is operatively arranged to slide the first slide connector first element 516 relative to the first slide connector second element 518. That is, the first actuator 508 is operatively coupled to move the conveyor element 300 along the path 504A defined by the slide connector 504.

Referring to FIGS. 2, 3, and 5, in the embodiment shown, the second actuator 510 includes a second linear actuator 534, such as a second linear servomotor. For example, the second linear servomotor may include a LinMot® encoder and slider available from NTI AG of Spreitenbach, Switzerland. In the embodiment shown, the second linear actuator 534 includes a second linear actuator first component 536 actuatable for linear movement with respect to a second linear actuator second component 538. The second actuator 510 defines a second actuator actuating axis 510A along which the second linear actuator first component 536 is movable relative to the second linear actuator second component 538. In some alternative exemplary embodiments, the second actuator 510 may comprise one or more of any type or configuration of actuator suitable to cause the drive system 500 to move the conveyor element 300 relative to the support element 400 in desired motions as described herein.

The second linear actuator first component 536 is pivotably coupled to the second pivot connector first element 520. Specifically, in the embodiment shown, the second pivot connector first element 520 includes the swing arm 524, and the second linear actuator first component 536 is pivotably coupled to the swing arm 524. Referring to FIG. 5, the second linear actuator first component 536 is pivotably coupled to the swing arm 524 at a second radial distance 540 from the second pivot connector axis of rotation 506A. In the embodiment shown, the second radial distance 540 is greater than the first radial distance 526 (FIG. 4). The second linear actuator second component 538 is pivotably coupled to the second pivot connector second element 522. Specifically, in the embodiment shown, the second pivot connector second element 522 forms a part of the support frame 402, and the second linear actuator second component 538 is pivotably coupled to the support frame 402. Thus, the second actuator 510 is operatively coupled between the second pivot connector first element 520 and the second pivot connector second element 522, and the second actuator 510 is operative to rotate the second pivot connector first element 520 relative to the second pivot connector second element 522.

In the embodiment shown, because the first slide connector 504 is disposed on the second pivot connector first element 520, the second actuator 510 is operatively coupled to angularly reposition the slide connector 504 about the second pivot connector axis of rotation 506A, which is also the axis of rotation of the swing arm 524. That is, the second actuator 510 is operative to angularly reposition the first slide connector 504 relative to horizontal.

Referring to FIGS. 2, 4, and 5, in the embodiment shown, the first actuator 508 and the second actuator 510 are arranged such that the first actuator actuating axis 508A is oriented obliquely relative to the second actuator actuating axis 510A. As used herein, "oblique" may refer to lines or orientations that are disposed at a non-zero angle with respect to one another (e.g., non-parallel). Referring to FIGS. 2 and 4, in the embodiment shown, the first actuator actuating axis 508A is oriented obliquely relative to the conveyor element axis 314. Referring to FIGS. 2 and 5, in the embodiment shown, the second actuator actuating axis 510A is oriented substantially parallel to the conveyor element axis 314. As used herein, "parallel" may refer to lines or orientations that extend in the same direction, equidistant, and never meeting (e.g., straight, coplanar lines that do not intersect).

Referring to FIGS. 1-4, the first pivot connector 502, the first slide connector 504, and the second pivot connector 506 may comprise a first linkage assembly 600 operatively interposing the conveyor element 300 and the support element 400. In the illustrated embodiment, a second linkage assembly 602 also operatively interposes the conveyor element 300 and the support element 400. In this embodiment, the second linkage assembly 602 is substantially identical to the first linkage assembly 600. Referring to FIGS. 1, 3, and 4, in the embodiment shown, the swing arm 524 of the first linkage assembly 600 is coupled to a corresponding swing arm of the second linkage assembly 602 by a connecting arm 604 so that rotation of the respective swing arms 524 about the respective second pivot connections 506 is coordinated.

An exemplary method of making a vibratory conveyor system 100 includes one or more of the following operations. The first pivot connector 502 is coupled to the first slide connector 504. Specifically, the first pivot connector second element 514 is coupled to the first slide connector first element 516. The first slide connector 504 is coupled to the second pivot connector 508. In particular, the first slide connector second element 518 is coupled to the second pivot connector first element 520. The second pivot connector 508 is coupled to the support element 400. Specifically, the second pivot connector second element 522 is coupled to the support element 400. The conveyor element 300 is coupled to the first pivot connector 502. In particular, the conveyor element 300 is coupled to the first pivot connector first element 512.

The first actuator 508 is operatively coupled to move the conveyor element 300 along the first slide connector 504 relative to the second pivot connector 506. The first actuator 508 is mounted so that the first actuator actuating axis 508A is oriented obliquely relative to the conveyor element axis 314. The first actuator 508 is pivotably coupled to the first pivot connector first element 512, and the first actuator 508 is pivotably coupled to the second pivot connector second element 522.

The second actuator 510 is operatively coupled to rotationally reposition the first slide connector 504 about the second pivot connector 506. The second actuator 510 is mounted so that the second actuator actuating axis 510A is oriented substantially parallel with the conveyor element axis 314. The second actuator 510 is pivotably coupled to the second pivot connector first element 520, and the second actuator 510 is pivotably coupled to the second pivot connector second element 522. The first and second actuators 508, 510 are arranged such that the respective first and second actuator actuating axes 508A, 510A do not extend toward a center of gravity of the pan 302.

The controller 102 is operatively coupled to the first actuator 508 and the second actuator 510. The controller 102 is programmed to direct operation of the first actuator 508 and the second actuator 510 to generate a cyclic vibrational motion of the conveyor element 300. In various exemplary embodiments, the controller 102 may be configured to cause the actuators 508, 510 to operate with any desired stroke and/or pitch, to produce any desired movement of the conveyor element 300. For example, the controller 102 may be programmed to cause the actuators 508, 510 to produce tear-drop shaped motions, parabolic motions, and/or reverse-flow motions of the conveyor element 300. Among other things, the controller 102 may be programmed to produce repeated substantially identical movements and/or to provide movements that vary over time. The controller 102 may be programmed to produce motion at different speeds and/or accelerations in different directions (e.g., slow forward, fast backward). In some exemplary embodiments, the controller 102 is programmed utilizing G-code.

An exemplary method of operating a vibratory conveyor system 100 includes one or more of the following operations. A conveyor element 300 is moved in a cyclic motion including a horizontal component and a vertical component in each of a plurality of repeated cycles. In each of the repeated cycles, the first actuator 508 is operated to move the conveyor element 300 along the path 504A defined by the linear slide connector 504. In each of the repeated cycles, the second actuator 510 is operated to change the angle of the first slide connector 504 relative to horizontal. In some exemplary embodiments, the first actuator 508 and the second actuator 510 are operated simultaneously to move the conveyor element 300 along the path 504A and to change the angle of the first slide connector 504 relative to horizontal.

In alternative embodiments, the second actuator 510 is be used to position and hold the swing arm 524 so that the path 504A of the slide connector 504 is disposed at an angle with respect to horizontal (e.g., 25 degrees). Then, the first actuator 508 is be used to move the conveyor element 300 back and forth along the path 504A to cause the conveyed material 104 to move along the conveyor element 300.

Figure 6:
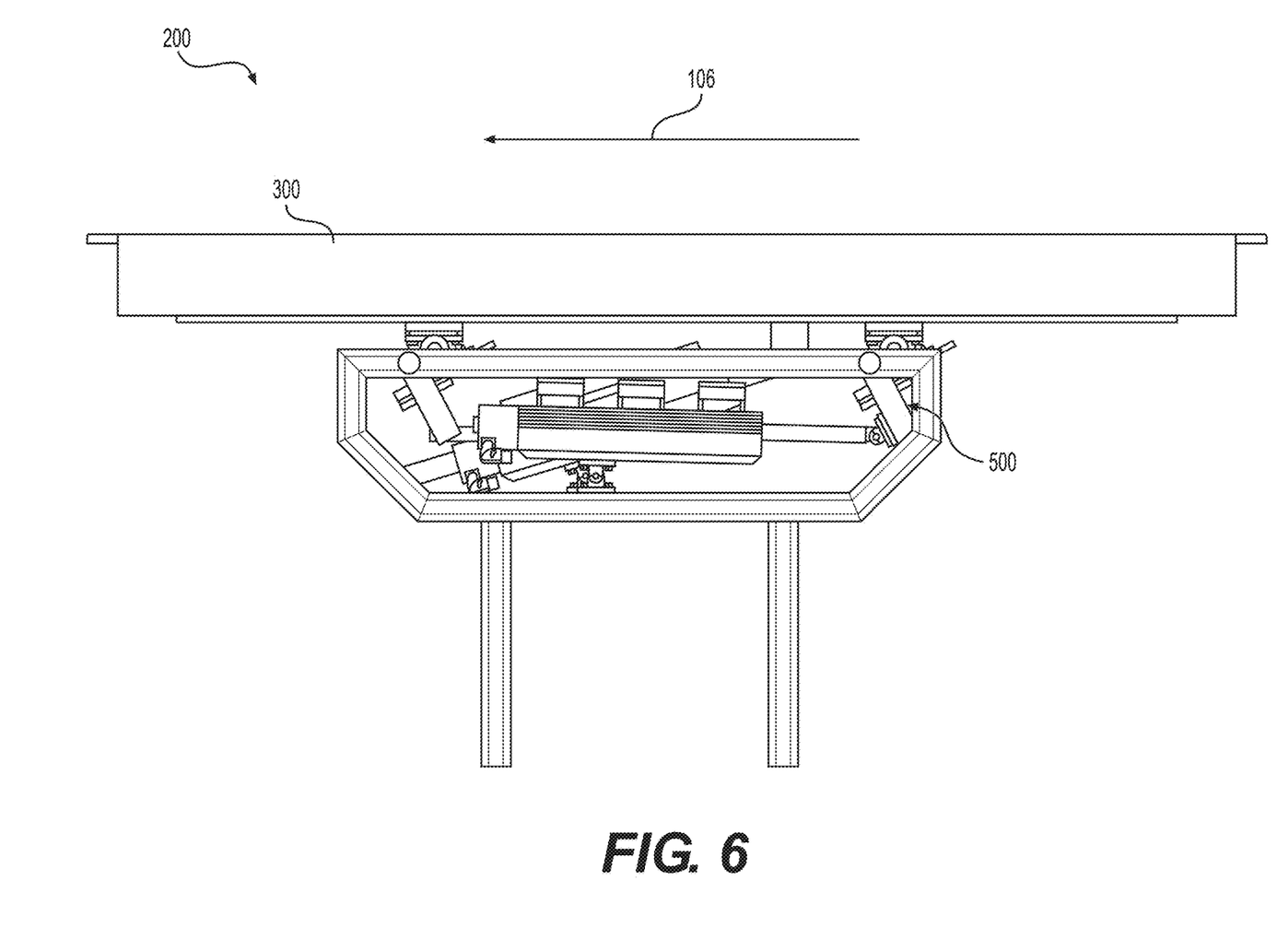
FIG. 6 is a side elevation view of the vibratory conveyor of FIG. 2.
Figure 7:
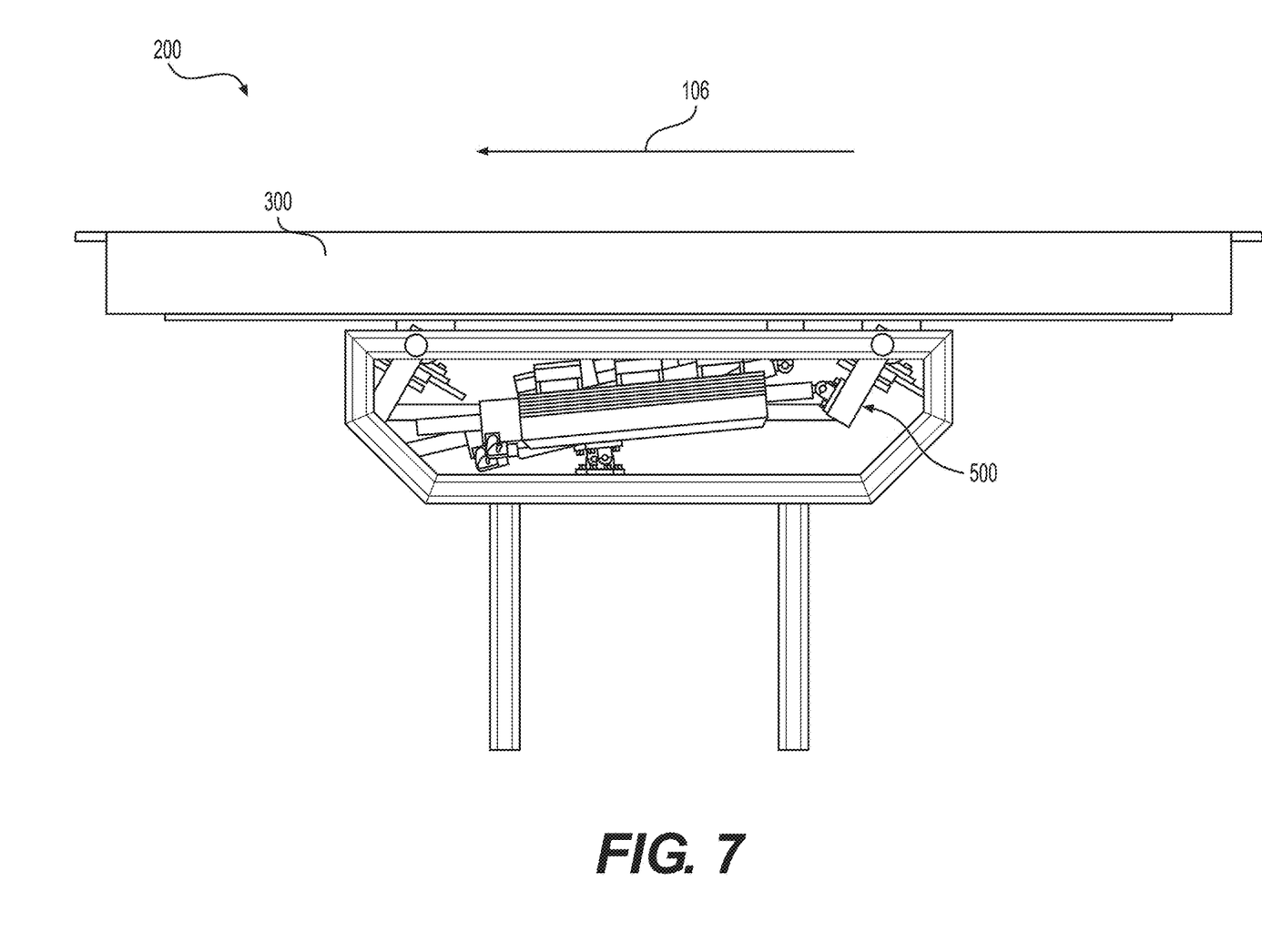
FIG. 7 is a side elevation view of the vibratory conveyor of FIG. 2, similar to FIG. 6, but in a different operating position.

FIGS. 6 and 7 are side elevation views of the vibratory conveyor 200 illustrating exemplary operating positions of the conveyor element 300 produced by motion of the drive system 500.

As used herein, terms such as "coupled" or "mounted" may refer to components that are directly or indirectly connected or attached. Accordingly, unless explicitly stated otherwise, components may be coupled or mounted to each other (e.g., indirectly) even where one or more other structures physically interposes the coupled or mounted components.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A vibratory conveyor, comprising:
   a support frame;
   a pan configured to receive a conveyed material, the pan mounted for cyclic movement relative to the support frame, the pan having a pan axis generally aligned with a conveying direction; and
   at least two linear servomotors operatively coupled to move the pan relative to the support frame, the at least two linear servomotors comprising a first linear servomotor and a second linear servomotor;
   wherein the first linear servomotor defines a first linear servomotor actuating axis;
   wherein the second linear servomotor defines a second linear servomotor actuating axis;
   wherein the first linear servomotor actuating axis is oriented obliquely relative to the second linear servomotor actuating axis; and
   the first and second linear servomotors are arranged such that the respective first and second linear servomotor actuating axes do not extend toward a center of gravity of the pan.

2. The vibratory conveyor of claim 1, wherein the first linear servomotor actuating axis is oriented obliquely relative to the pan axis.

3. The vibratory conveyor of claim 2, wherein the second linear servomotor actuating axis is oriented substantially parallel to the pan axis.

4. The vibratory conveyor of claim 1, wherein the second linear servomotor actuating axis is oriented substantially parallel to the pan axis.

5. A vibratory conveyor, comprising:
   a support frame;
   a pan configured to receive a conveyed material, the pan mounted for cyclic movement relative to the support frame, the pan having a pan axis generally aligned with a conveying direction;
   at least two linear servomotors operatively coupled to move the pan relative to the support frame, the at least two linear servomotors comprising a first linear servomotor and a second linear servomotor;
   wherein the first linear servomotor defines a first linear servomotor actuating axis;
   wherein the second linear servomotor defines a second linear servomotor actuating axis;
   wherein the first linear servomotor actuating axis is oriented obliquely relative to the second linear servomotor actuating axis; and
   a linear slide connector operatively interposing the pan and the support frame;
   wherein the first linear servomotor is operatively coupled to move the pan along a path defined by the slide connector.

6. The vibratory conveyor of claim 5,
   wherein the slide connector is angularly repositionable about a generally horizontal axis; and
   wherein the second linear servomotor is operatively coupled to angularly reposition the slide connector about the axis.

7. A vibratory conveyor system, comprising:
   the vibratory conveyor of claim 1; and
   a controller configured to direct operation of the first linear servomotor and the second linear servomotor.

8. A drive system for a vibratory conveyor, the vibratory conveyor comprising a conveyor element mounted for movement relative to a support element, the drive system comprising:
   a first pivot connector comprising a first pivot connector first element rotatably coupled to a first pivot connector second element, the first pivot connector first element configured to be coupled to the conveyor element;
   a first slide connector comprising a first slide connector first element slidably coupled to a first slide connector second element, the first slide connector first element coupled to the first pivot connector second element;
   a second pivot connector comprising a second pivot connector first element rotatably coupled to a second pivot connector second element, the second pivot connector first element coupled to the first slide connector second element, and the second pivot connector second element configured to be coupled to the support element;
   a first actuator operatively arranged to slide the first slide connector first element relative to the first slide connector second element; and
   a second actuator operatively coupled between the second pivot connector first element and the second pivot connector second element, the second actuator operative to rotate the second pivot connector first element relative to the second pivot connector second element.

9. The drive system of claim 8, wherein the first actuator is operatively disposed between the first pivot connector first element and the second pivot connector second element.

10. The drive system of claim 9,
    wherein the first actuator comprises a first linear actuator comprising a first linear actuator first component actuatable for linear movement with respect to a first linear actuator second component;
    wherein the first linear actuator first component is configured to be pivotably coupled to the first pivot connector first element; and
    wherein the first linear actuator second component is configured to be pivotably coupled to the second pivot connector second element.

11. The drive system of claim 10, wherein the first linear actuator first component is configured to be pivotably coupled to the conveyor element.

12. The drive system of claim 10,
    wherein the second actuator comprises a second linear actuator comprising a second linear actuator first component actuatable for linear movement with respect to a second linear actuator second component;
wherein the second linear actuator first component is pivotably coupled to the second pivot connector first element; and
wherein the second linear actuator second component is pivotably coupled to the second pivot connector second element.

13. The drive system of claim 12,
wherein the first linear actuator defines a first linear actuator actuating axis;
wherein the second linear actuator defines a second linear actuator actuating axis;
wherein the first linear actuator actuating axis is oriented obliquely relative to the second linear actuator actuating axis.

14. The drive system of claim 8,
wherein the second pivot connector first element comprises a swing arm;
wherein the first slide connector is disposed on the swing arm at a first radial distance from an axis of rotation of the swing arm; and
wherein the first radial distance is greater than zero.

15. The drive system of claim 14,
wherein the second actuator comprises a second linear actuator;
wherein the second linear actuator comprises a second linear actuator first component actuatable for linear movement with respect to a second linear actuator second component;
wherein the second linear actuator first component is pivotably coupled to the swing arm at a second radial distance from the axis of rotation of the swing arm; and
wherein the second radial distance is greater than the first radial distance.

16. The drive system of claim 8, further comprising a controller configured to direct operation of the first actuator and the second actuator.

17. A vibratory conveyor system, comprising:
the drive system of claim 8;
the conveyor element, the first pivot connector coupled to the conveyor element; and
the support element, the second pivot connection coupled to the support element.

18. The vibratory conveyor system of claim 17, wherein the conveyor element comprises a pan configured to receive a conveyed material.

19. The vibratory conveyor system of claim 18, wherein the pan comprises a screen configured to separate the conveyed material.

\* \* \* \* \*